(12) United States Patent
Boldrin et al.

(10) Patent No.: US 8,128,036 B2
(45) Date of Patent: Mar. 6, 2012

(54) VERNIER ACTIVE FLOW CONTROL EFFECTOR

(75) Inventors: Clete M. Boldrin, Bellevue, WA (US); Ahmed A. Hassan, Mesa, AZ (US)

(73) Assignee: The Boeing Company, Chicago, IL (US)

(*) Notice: Subject to any disclaimer, the term of this patent is extended or adjusted under 35 U.S.C. 154(b) by 1090 days.

(21) Appl. No.: 11/736,721

(22) Filed: Apr. 18, 2007

(65) Prior Publication Data
US 2009/0321580 A1   Dec. 31, 2009

Related U.S. Application Data

(62) Division of application No. 10/890,639, filed on Jul. 14, 2004, now Pat. No. 7,255,309.

(51) Int. Cl.
B64C 21/04 (2006.01)
B64C 21/06 (2006.01)

(52) U.S. Cl. ............................. 244/208; 417/413.1

(58) Field of Classification Search ............. 244/207, 244/208, 199.1, 200.1, 201, 130; 417/413.1, 417/560
See application file for complete search history.

(56) References Cited

U.S. PATENT DOCUMENTS

| | | | |
|---|---|---|---|
| 2,545,010 A | 3/1951 | Stalker | |
| 3,669,386 A * | 6/1972 | Jacobs et al. | 244/52 |
| 4,382,569 A | 5/1983 | Boppe et al. | |
| 5,054,720 A | 10/1991 | Page | |
| 5,649,678 A * | 7/1997 | Nurick | 244/17.19 |
| 5,788,191 A | 8/1998 | Wake et al. | |
| 5,813,625 A | 9/1998 | Hassan et al. | |
| 5,938,404 A | 8/1999 | Domzalski et al. | |
| 5,957,413 A | 9/1999 | Glezer et al. | |
| 6,042,059 A | 3/2000 | Bilanin et al. | |
| 6,092,090 A | 7/2000 | Payne et al. | |
| 6,092,990 A | 7/2000 | Hassan et al. | |
| 6,135,395 A | 10/2000 | Collett | |
| 6,234,751 B1 | 5/2001 | Hassan et al. | |
| 6,302,360 B1 | 10/2001 | Ng | |
| 6,390,116 B1 | 5/2002 | Kim et al. | |
| 6,471,477 B2 | 10/2002 | Hassan et al. | |
| 6,543,719 B1 | 4/2003 | Hassan et al. | |
| 6,644,598 B2 | 11/2003 | Glezer et al. | |
| 6,685,143 B1 | 2/2004 | Prince et al. | |
| 6,713,901 B2 | 3/2004 | Hassan et al. | |

(Continued)

OTHER PUBLICATIONS

Geissler, W., et al., "Dynamic Stall and its Passive Control Investigations on the OA209 Airfoil Section", Germany, pp. 41.1-41.14.

(Continued)

Primary Examiner — Tien Dinh
Assistant Examiner — Joseph W Sanderson
(74) Attorney, Agent, or Firm — Harness, Dickey & Pierce, P.L.C.

(57) ABSTRACT

Methods and apparatus for controlling the attitude of a mobile platform with a resolution suitable for vernier attitude control. In one embodiment a method includes flowing fluid through an orifice of an aerodynamic surface. The method also includes modifying a boundary layer of the aerodynamic surface with the flowing fluid. Another embodiment provides an aerodynamic member of a mobile platform. The aerodynamic member includes an aerodynamic surface, an orifice, an actuator, and a fluid moving member. The orifice is in the aerodynamic surface and the actuator is subject to friction and backlash. The fluid moving member communicates with the orifice and causes the fluid to flow through the orifice to modify the boundary layer of aerodynamic surface.

19 Claims, 3 Drawing Sheets

U.S. PATENT DOCUMENTS

| | | | |
|---|---|---|---|
| 6,751,530 B2 * | 6/2004 | Seifert et al. | 701/4 |
| 6,821,090 B1 | 11/2004 | Hassan et al. | |
| 6,866,234 B1 | 3/2005 | Hassan et al. | |
| 6,899,302 B1 | 5/2005 | Hassan et al. | |
| 6,994,297 B1 | 2/2006 | Hassan et al. | |
| 7,048,235 B2 | 5/2006 | McLean et al. | |
| 7,143,983 B2 * | 12/2006 | McClure | 244/204 |
| 7,255,309 B2 * | 8/2007 | Boldrin et al. | 244/208 |
| 2002/0081198 A1 | 6/2002 | Hassan et al. | |
| 2002/0195526 A1 | 12/2002 | Barrett et al. | |
| 2003/0229428 A1 * | 12/2003 | Seifert et al. | 701/4 |
| 2005/0056731 A1 | 3/2005 | Hamilton et al. | |
| 2006/0027711 A1 | 2/2006 | Boldrin et al. | |

OTHER PUBLICATIONS

Kinneard, Doug, "A Small Product's Big Potential", article, Boeing Frontiers Online, Sep. 2003, vol. 02, Issue 05.

Madsen, Casey, Hassan, Ahmed A., Schwimley, Scott, "Alteration of the FlowField in a Transonic Flow Environment Using Synthetic Jets", AIAA 2006-3159, copyright 2006.

Singh, C. et al., "Control of Rotorcraft Retreating Blade Stall Using Air-Jet Vortex Generators", Journal of Aircraft, vol. 43, No. 4, Jul.-Aug. 2006, pp. 1169-1176.

* cited by examiner

VERNIER ACTIVE FLOW CONTROL EFFECTOR

CROSS-REFERENCE TO RELATED APPLICATIONS

This application is a divisional of U.S. patent application Ser. No. 10/890,639 filed on Jul. 14, 2004, and presently allowed. The disclosure of the above application is incorporated herein by reference.

FIELD

This disclosure relates generally to control surfaces for mobile platforms and, more particularly, to actuators for vernier control of aircraft attitude.

BACKGROUND

Emerging precision flight applications are generating control surface actuator performance requirements that exceed the capability of electrical and hydraulic actuator technology. For example, a vehicle performing a carrier landing must keep within ±12 in of the projected landing approach flight trajectory near touch-down in order to avoid a wave-off and to successfully hook the arrestor cable. The control requirement for naval style mid-air refueling is even more demanding than the requirement for the carrier landing. In the refueling scenario, a low-on-fuel vehicle has to intercept a fuel hose basket to within ±6 inches while the tanker maintains a constant flight trajectory. While not quite as demanding on the aircraft as the naval scenario, Air Force style refueling still requires the low-on-fuel vehicle to maintain its position relative to the tanker within ±4 ft. Meanwhile, the boom operator aboard the tanker has to "fly" the 40-ft long boom to within ±6 inches of the bobbing fuel probe on the low-on-fuel aircraft. Thus, the ruddevators (i.e. small wings on the refueling boom) must be controlled rather accurately. The need for an aircraft to hook a cable, or intercept a refuel drogue, or the like translates into control surface deflections so small that they lie beneath the range of the minimum achievable backlash in available actuator gearheads and linkages. Moreover, static friction in the control systems causes resistance to the small movements associated with the vernier attitude control required for such demanding operations. These nonlinearities limit the size of the smallest control surface movement that can be reliably repeated. Even perfect actuator position feedback along with unlimited control system throughput cannot avoid the detrimental effects of the nonlinearities.

Automatic control, during operations requiring vernier control, is therefore not currently achievable. Manned vehicles have succeeded in carrying out these difficult piloting tasks only because pilots adapt to nonlinearity (e.g. the friction and backlash in the control system) in subtle ways that heretofore have defied duplication in software. The nonlinearities impeding the automation of these tasks, though, cannot be eliminated because they are inherent in the available actuator technology.

Attempting to work around the resulting dead band using smaller rate command steps is possible, at least theoretically. Doing so would require boosting actuator loop gain and controlling pitch rate; roll rate, or yaw rate primarily through pulse width modulation of the actuator commands. However, this solution invites limit-cycle oscillations (e.g. actuator "hunting") that reduce actuator life through excessive fatigue. Other previous attempts at controlling pitch, roll, and yaw rates include morphing airfoils into new shapes by using electrical or hydraulic actuators that drive hinged flaps or variable camber surface-bending mechanisms. Although these previous control systems have performed "coarse" attitude control satisfactorily, in the future, much faster, higher resolution control will be needed than can be achieved with this technology.

Another work-around might involve using an electro-hydraulic "coarse" position actuator supplemented with a smaller "fine" position control actuator that has higher bandwidth capability. The smaller actuator's loop gain could also be increased so that the vehicle will follow the fine actuator the majority of the time. The coarse actuator would therefore quietly serve in a secondary role for causing relatively large attitude changes. Unfortunately, all of the problems previously discussed with respect to the larger actuator would also apply to the fine actuator. Plus, because of the high gain required for the small actuator, instabilities could develop in the "fine" control system, Thus, a need exists for a mobile platform attitude control system that provides vernier attitude control sufficient to maintain a mobile platform within about six inches, or less, of a target trajectory.

SUMMARY

It is in view of the above limitations that the present disclosure was developed. The present disclosure provides methods and apparatus for providing vernier attitude control for a mobile platform. More particularly, the present disclosure provides a high-resolution high-bandwidth control system that is completely free of backlash and static friction.

In a first embodiment, a method includes flowing fluid through an orifice of an aerodynamic surface. The flowing fluid modifies a boundary layer associated with the aerodynamic surface to control the attitude of the mobile platform. The quantity of fluid flowing through the orifice defines the resolution of possible control actions. Mobile platforms employing the method of the current embodiment may automatically land on an aircraft carrier or automatically refuel. Of course, the mobile platform may be a marine vehicle or even an unmanned aircraft. Further, the modification of the boundary layer can oppose the effect caused by the actuator and can result in maintaining the mobile platform within about six inches of the target. Moreover, the modification of the boundary layer may change the roll, yaw, or pitch of the mobile platform as if a control surface moved by as much as about 1 degree or more. Preferably, the fluid flow may be perpendicular to the aerodynamic surface and may separate the boundary layer from the surface. Additional fluid flows may be in the opposite direction of the first fluid flow and may be on opposite sides of the surface from the first fluid flow. Additionally, the effect of the modification of the boundary layer may be automatically sensed and used to further modify the flow of the fluid.

In a second embodiment an aerodynamic member of a mobile platform is provided. The aerodynamic member includes an aerodynamic surface, an orifice, an actuator, and a fluid moving member. The orifice is in the aerodynamic surface and the actuator is subject to friction and backlash. The fluid moving member communicates with the orifice and causes the fluid to flow between the fluid moving member and the orifice in order to modify the boundary layer of the aerodynamic surface. Of course, the aerodynamic member may be adapted for either subsonic or supersonic movement.

A third embodiment provides a mobile platform with a vernier attitude control system. The mobile platform includes an aerodynamic surface, an orifice and an actuator acting as a fluid moving member. The orifice is in the aerodynamic surface and the actuator is subject to friction and backlash. The fluid moving member communicates with the orifice and causes the fluid to flow between the orifice and itself to modify the boundary layer of the aerodynamic surface.

In yet another embodiment, the present disclosure provides an automatic, vernier, attitude, control system. The system includes an attitude sensor, a comparator, and an active flow control actuator. The comparator compares the attitude sensed by the sensor to the desired attitude and commands the actuator based on the comparison. The resolution of control provided by the system is defined by the flow rate of the active flow control actuator.

Advantageously, the control systems provided by the present disclosure do not require a constant system gain. Inertial measurement unit sensor feedback (for example) can therefore be used to compensate for even wide variations in actuator gain. Further, because the control systems provided by the present disclosure are free of static friction and backlash, the systems enjoy essentially infinite resolution and high bandwidth while experiencing only negligible delay between the issuance of a command for corrective action and the completion of the corrective action.

Further features and advantages of the present disclosure, as well as the structure and operation of various embodiments of the present disclosure, are described in detail below with reference to the accompanying drawings.

BRIEF DESCRIPTION OF THE DRAWINGS

The accompanying drawings, which are incorporated in and form a part of the specification, illustrate the embodiments of the present disclosure and together with the description, serve to explain the principles of the disclosure. In the drawings.

DETAILED DESCRIPTION

Figure 1:
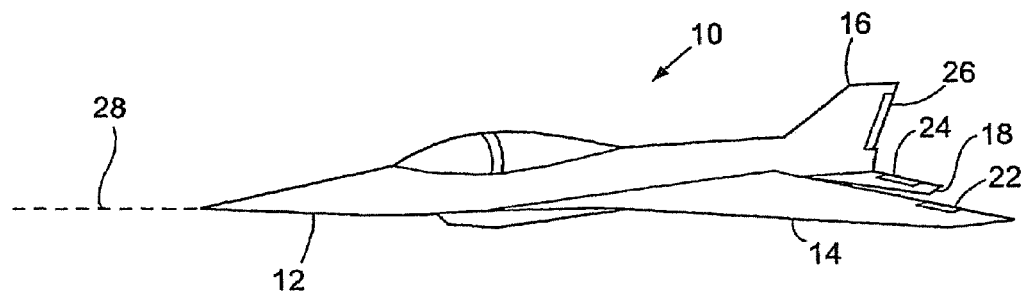
FIG. 1 illustrates a mobile platform constructed in accordance with the principals of the present disclosure.

Referring to the accompanying drawings in which like reference numbers indicate like elements, FIG. 1 illustrates a mobile platform constructed in accordance with the principals of the present disclosure.

The mobile platform 10 uses active flow control (AFC) jet actuators (electromagnetic or piezo) to provide vernier control of the lift, drag, and pitching moments that act on it. An exemplary AFC actuator is disclosed in U.S. Pat. No. 6,713,901 issued to Hassan et al and entitled, "Linear Electromagnetic Zero Net Mass Jet Actuator" which is incorporated herein as if set forth in full. The interaction of the oscillatory jet provided by the AFC actuators with the mean flow over the aerodynamic surface, and the resulting modulation in the aerodynamics forces acting on the surface, requires only a small fraction of a second. In contrast, conventional control surfaces used to alter the lift, drag, and pitching moments of an aerodynamic surface must overcome their inertia that, in turn, causes their response time to be inherently long. Therefore, AFC-equipped vehicles can respond to unsteady gusts quicker, hold altitude more accurately, and can track desired flight trajectories more accurately than vehicles equipped with conventional electrical or hydraulic actuators. In particular, because the small oscillating flow rate of the AFC actuators defines the attitude resolution achievable via the present disclosure, an order of magnitude improvement in vernier attitude control is provided by the present disclosure.

With continuing reference to FIG. 1, a mobile platform 10 is shown including a fuselage 12, a pair of wings 14, and a vertical stabilizer 16, and a pair of horizontal stabilizers 18. More particularly, the wings 12 each include ailerons 22 and other types of control surfaces. Likewise, the horizontal stabilizers 18 each include an elevator 24 while the vertical stabilizer includes a rudder 26. During the majority of time, the user of the aircraft 10 desires for it to move in a curvilinear trajectory through the atmosphere while being approximately at equilibrium with its environment. However, natural and man-made disturbances (e.g. wind gusts and the wakes of other aircraft) cause unbalanced forces and moments to act on the aircraft 10. If left uncorrected, these unbalanced forces push the aircraft 10 from its desired attitude and desired trajectory 28. The pilot or autopilot reacts by adjusting the position of the control surfaces (e.g. the ailerons 22, the elevators 24, or rudder 26) to steer the aircraft 10 back toward the desired trajectory 28 in a manner well known in the art. Backlash, friction, and other non-linear aspects of the aircraft control system limit how quickly the adjustments can be made as well as limiting the resolution, precision, and repeatability with which the adjustments actually occur. The present disclosure provides apparatus and methods that essentially eliminate the undesired delay, inaccuracy, imprecision, and non-repeatability associated with using previously available approaches for vernier control for maintaining a desired trajectory.

Figure 2:
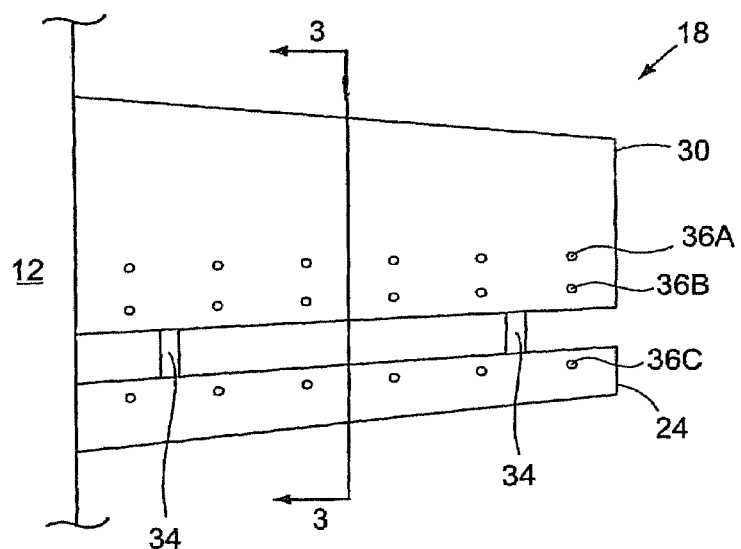
FIG. 2 illustrates an aerodynamic member of the mobile platform illustrated in FIG. 1.

Turning now to FIG. 2, a top plan view of the horizontal stabilizer 18 of FIG. 1 is illustrated. FIG. 2 also shows the lifting surface 30 of the stabilizer 18, the elevator 24, a pair of conventional actuators 34, and a plurality of AFC actuators 36. The traditional actuators 34 adjust the position of the elevator 24 relative to the lifting surface 30 to assist in providing coarse control of the aircraft 10 attitude. The AFC actuators 36 are shown as being distributed in an array on the elevator 24 and lifting surface 30, although such an orderly pattern need not be used to practice the present disclosure. For instance, just one AFC actuator 36 could be employed in some applications. While the AFC actuators 36 on the horizontal stabilizer 18 are shown on the top, and toward the trailing edge, of the horizontal stabilizer 18, the AFC actuators 36 could also be on the bottom and in more forward locations than the positions shown.

Figure 3:
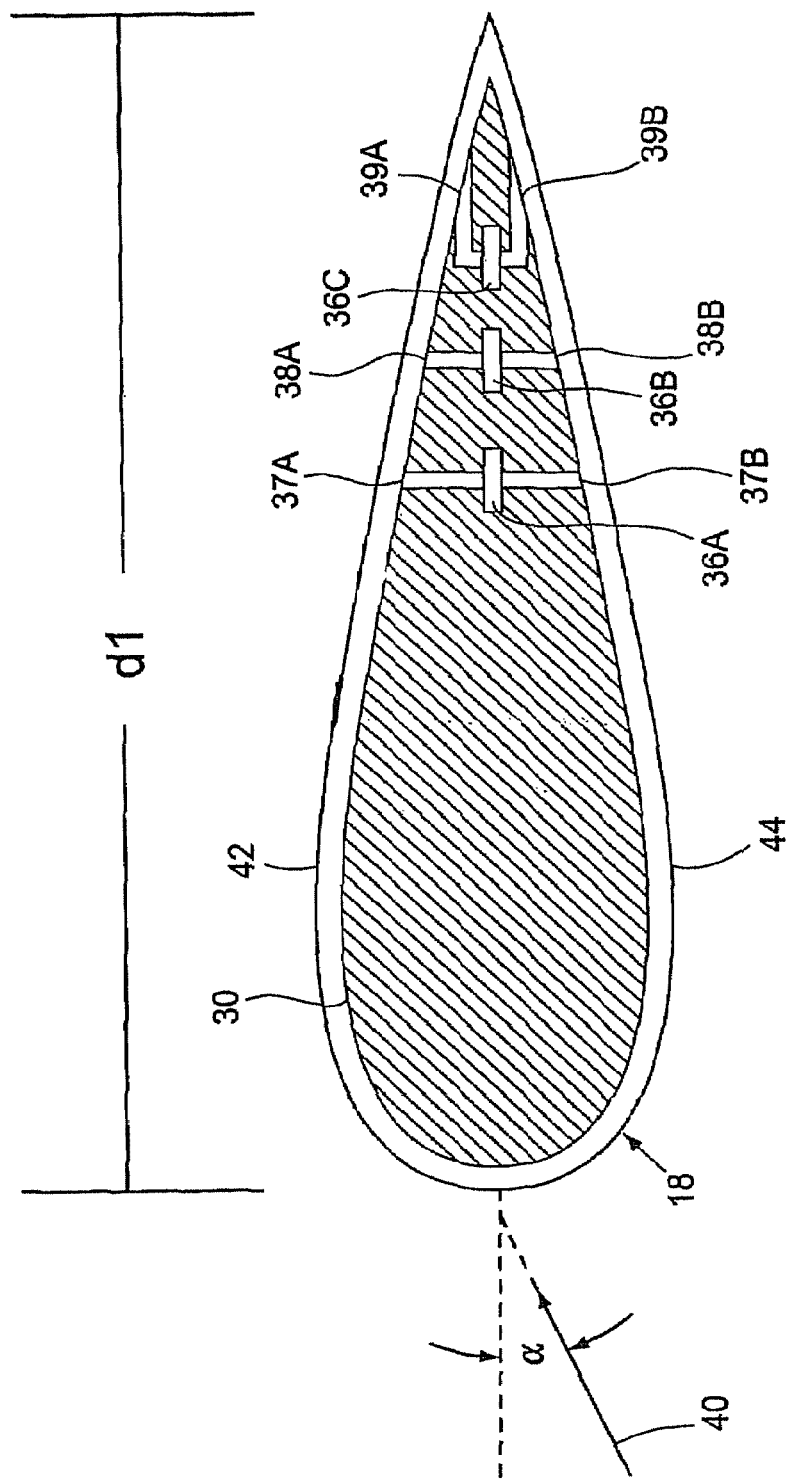
FIG. 3 illustrates a cross section taken along line 3-3 of the aerodynamic surface of FIG. 2.

Now referring to FIG. 3, a cross section of the horizontal stabilizer 18 is illustrated. For clarity only the lifting surface 30 has been shown, although, the present disclosure applies to the elevator 24 as well as other aerodynamic surfaces of the aircraft 10. As those in the art understand, an aerodynamic "surface" is actually a body such as a wing, airfoil, stabilizer, or control surface with two sides (e.g. upper and lower or starboard and aft sides) and is generally intended to interact with the fluid flowing adjacent to it. The cross sectional view shows the stabilizer 18 in relation to the airflow as designated by the arrow 40. The airflow approaches the leading edge of the stabilizer 18 at an angle of attack a (i.e. the stabilizer 18 moves through the air at the angle of attack) and forms a boundary layer 42 and 44 on both the upper and lower sides of the stabilizer 18 respectively. It will be understood that the boundary layers 42 and 44 shown are simplified representations of complex phenomenon. The pressure of the boundary layers 42 and 44 acting on the area of the upper and lower sides of the stabilizer 18 create a net force on the stabilizer 18.

Thus, a change in either boundary layer 42 or 44, or the area of the stabilizer 18 that they act against, will cause a change in the lift provided by the stabilizer 18.

At any given distance from the fuselage 12 (i.e. a station) the stabilizer 18 has a chord length d1 between the leading edge and the trailing edge. Positions on the stabilizer 18 at any station may be described with reference to a fraction of how far along the distance d1 the position is, as measured from the leading edge. Thus, a position that is 60% of the distance d1 from the leading edge is referred to as being at the 0.60 position.

As shown by FIG. 3, the stabilizer 18 of the present embodiment includes three actuators 36 and three orifices 37A, 38A, and 39A. The orifices 37A, 38A, and 39A allow fluid to communicate between the actuators 36 and the boundary layer region 42. Also, the three orifices 37A, 38A, and 39A are preferably positioned one each at the 0.70, 0.80, and 0.90 positions on the stabilizer 18. As disclosed in U.S. Pat. No. 6,713,901 each of the Zero Net Mass Jet Actuators 36 acts by causing oscillating jet/suction pulses at the associated orifice 37A, 38A, or 39A. The oscillating flows at the orifices 37A, 38A, 39A cause vortices in the boundary layer 42. In turn, the net force caused by the boundary layer 42 on the stabilizer 18 changes and alters the pressure acting on the stabilizer 18 downstream of the orifices 37. The aircraft 10 (of FIG. 1) therefore experiences a change in the forces acting on it and responds accordingly. A second set of orifices 37B, 38B, and 39B is provided on the under side of the stabilizer 18. The second set of orifices 37B, 38B, 39B is ported to the side of the actuators 36 opposite the side of the actuators 36 to which the first set of orifices 37A, 38A, and 39A is ported. Orifices 37B, 38B, and 39B thus take advantage of the oscillating flows from the other side of the actuators 36. The effect the actuators 36 have on the stabilizer 18 of the aircraft 10 is multiplied accordingly.

Two dimensional simulations on a T-33 have shown that the system illustrated by FIG. 3 can produce a pitch moment equivalent to that caused by a deflection of the elevator of up to 1.21 degrees. This is more than sufficient to eliminate limit cycle oscillations in the coarse pitch control loop and the resulting ±10 foot (305 CM) altitude wandering that traditional attitude control systems produce. The simulations also showed that, preferably, the orifices 37, 38, and 39 should be positioned relative to the surface of the stabilizer 18 in a manner so that the airflow produced thereby is initially perpendicular to the applicable boundary layer 42 or 44. Thus, when the AFC actuators 36 cause the oscillating air flow, the resulting interaction of the airflow with the boundary layers 42 or 44, and the effect of the actuators 36 on the aircraft 10 attitude, is maximized (without causing an appreciable increase in drag).

The simulations typically assumed a zero angle of attack, a free stream Mach number of 0.55, a Reynolds number of 5.25 million per foot (fully turbulent flow), an altitude of 20,000 feet (6096 meters), and an air temperature of −12.2° F. Effectiveness of the AFC system for a non-zero elevator flap deflections was also verified. Simulations were likewise successfully run on a T-33 rudder, and on a T-33 aileron, to verify the capability of AFC actuators to provide control authority with respect about the yaw and roll axes of the aircraft. Thus, the vernier control authority provided by the present disclosure is sufficient for a wide range of applications including, but not limited to those previously discussed (i.e. re-fueling and carrier landings). Since the two-dimensional simulations assumed an infinite span for the elevator, those skilled in the art will understand that the simulation results are conservative. Three-dimensional simulations are expected to show improved vernier attitude control authority even if fewer actuators are included in the simulation.

For applications involving higher free-stream subsonic Mach numbers, supersonic conditions, or where a shock wave is present, simulations also showed that the AFC actuators can produce significant pitch moments (on an order commensurate with as much as a 47% increase in lift associated with the surface area under consideration) if the actuators are placed near the foot of the shock.

Figure 4:
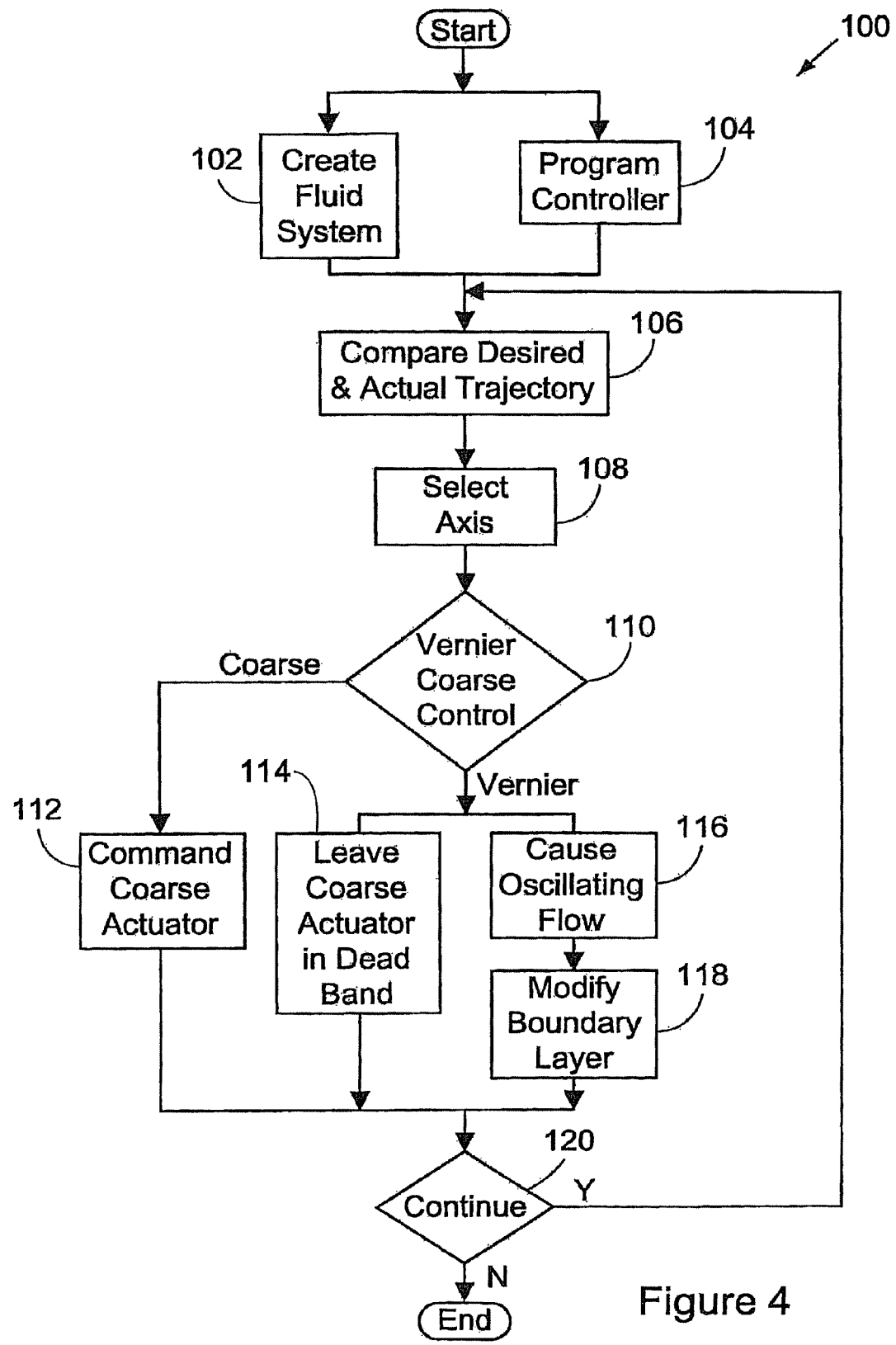
FIG. 4 illustrates a method in accordance with the principals of the present disclosure.

A method in accordance with the present disclosure is illustrated in FIG. 4. The method 100 generally includes determining whether a mobile platform is deviating from a desired attitude (or trajectory), choosing to correct the deviation with either the vernier or coarse control system, and correcting the deviation accordingly. More particularly, the method 100 includes incorporating an AFC actuation system into a new, or existing, aircraft at operation 102. Generally, in parallel with operation 102, a controller can be programmed in operation 104 to control the vernier (and coarse) actuators. The actual attitude of the aircraft and the desired attitude are compared, as shown at operation 106. Depending on the nature of any deviation from the desired attitude, one or more of the axes of the aircraft may be selected about which corrective action will be taken, as indicated at operation 108.

For each of the selected axes, a determination is made in operation 110 as to whether the vernier control system, the coarse control system, or both will be used to correct the deviation. Generally, the determination is made based on whether the correction falls within the deadband of the coarse actuator 34. In other words, if the coarse actuator 34 cannot provide the resolution required for the corrective action, the oscillating jet actuator 36 is selected. Otherwise, the coarse actuator 34 can be used. If the coarse system is to be used, then commands are sent to the coarse actuator(s) in operation 112. If not, then the coarse actuator 34 is left in its current position as shown at operation 114 and the command is sent to the vernier actuator as shown in operation 116. In turn, the vernier actuator 36 modifies the boundary layer thereby controlling the attitude in operation 118. The method 100 then determines if the deviation has been corrected (as indicated at operation 120). If not, the method 100 loops back to operation 106 and continues until the deviation is eliminated. If the deviation has been corrected, the method 100 continues in operation 106 until the next deviation is sensed. Appropriate commands are then generated as previously described.

In view of the foregoing, it will be seen that the several advantages of the present disclosure are achieved and attained. In general, the agile attitude control capabilities provided by the system and method of the present disclosure can improve the handling characteristics of any aircraft, missile, refueling boom, or other mobile platform. Further, the system and method also eliminates the inaccuracy, imprecision, and non-repeatability associated with maintaining a desired attitude using previously available approaches for attitude control. Moreover, the system and method enables the automation of many demanding mobile platform applications because the nonlinearities of traditional control systems are eliminated. By substituting, or supplementing, traditional actuators with the AFC actuators, the present disclosure also provides an order of magnitude improvement in the resolution of attitude control systems for mobile platforms.

The embodiments were chosen and described in order to best explain the principles of the present disclosure and its practical application to thereby enable others skilled in the art to best utilize the present disclosure in various embodiments and with various modifications as are suited to the particular use contemplated.

As various modifications could be made in the constructions and methods herein described and illustrated without departing from the scope of the present disclosure, it is intended that all matter contained in the foregoing description or shown in the accompanying drawings shall be interpreted as illustrative rather than limiting. For example, while the foregoing description expressly discussed control of mobile platforms in air, the present disclosure can also be applied to mobile platforms moving through water or other liquids. Thus, the breadth and scope of the present disclosure should not be limited by any of the above-described exemplary embodiments, but should be defined only in accordance with the following claims appended hereto and their equivalents.

What is claimed is:

1. A method of controlling the attitude of an airborne vehicle, comprising:
   using an actively controlled jet flow actuator that generates oscillating jet and suction pulses of air to control flowing fluid through an orifice of an aerodynamic member of the airborne vehicle, where the orifice is arranged such that the flowing fluid forms a fluid jet directed generally normal to a direction of motion of the airborne vehicle and in communication with a boundary layer adjacent the aerodynamic member;
   using the flowing fluid to modify the boundary layer adjacent the aerodynamic member, to create a modified boundary layer; and
   controlling the attitude of the airborne vehicle with a resolution defined by the fluid flowing through the orifice,
   forming a second orifice on said aerodynamic member at a spaced apart location of said orifice; and
   causing a fluid to flow through said second orifice to modify the boundary layer on said aerodynamic member at an area adjacent said second orifice,
   wherein the orifice and the second orifice are in flow communication with one another and also with opposing sides of the actuator.

2. The method of claim 1, wherein controlling the attitude of the airborne vehicle comprises controlling at least one of roll, yaw and pitch of the airborne vehicle.

3. The method of claim 1, further comprising causing the airborne vehicle to travel at subsonic speed while said fluid is flowing through said orifice.

4. The method of claim 1, further comprising using the let flow actuator to simultaneously modify the boundary layer on said aerodynamic member at an area adjacent said orifice and at an area adjacent said second orifice.

5. The method of claim 4, wherein said orifice and said second orifice are on opposing surfaces of said aerodynamic member.

6. The method of claim 4, wherein said orifice experiences a pulse of air from operation of said jet flow actuator, while said second orifice simultaneously experiences a suction force from operation of said let flow actuator.

7. The method of claim 1, wherein the method forms a method for assisting in aerial refueling by controlling the attitude of an aerial refueling aircraft.

8. A method of controlling the attitude of a airborne vehicle comprising:
   providing a jet flow actuator disposed within an aerodynamic member of the airborne vehicle;
   forming first and second orifices in said aerodynamic member at spaced apart locations on said aerodynamic member;
   locating said actuator in flow communication with both of said orifices; and
   using said jet flow actuator to generate oscillating suction and pulses of fluid flows at both of said orifices, where the fluid flows are directed generally normal to a direction of motion of the airborne vehicle and in communication with the boundary layer, to create a modified boundary layer of air adjacent an outer surface of said aerodynamic member in a vicinity of each of said first and second orifices, which alters an attitude of said airborne vehicle,
   wherein the first orifice and the second orifice are in flow communication with one another and also with opposing sides of the actuator.

9. The method of claim 8, wherein locating said first and second orifices comprises locating said first and second orifices on opposing surfaces of said aerodynamic member.

10. The method of claim 9, further comprising forming a plurality of additional pairs of orifices in said aerodynamic member, and locating a corresponding plurality of additional jet flow actuators within said aerodynamic member, with each specific one of said additional pair of orifices being operably associated with and in flow communication with a particular one of said additional plurality of jet flow actuators.

11. The method of claim 8, further comprising using a controller to control operation of said jet flow actuator.

12. The method of claim 8, wherein one of said fluid flows produced by said let flow actuator forms a jet of air directed outwardly through said first orifice that is generally perpendicular to the boundary layer on said aerodynamic member.

13. The method of claim 12, wherein one of said fluid flows produced by said jet flow actuator forms a suction force through said second orifice simultaneously with the creation of said jet of air outwardly through said first orifice.

14. A method of controlling the attitude of a airborne vehicle comprising:
   providing an actuator disposed within an aerodynamic member of the airborne vehicle;
   forming first and second orifices in said aerodynamic member at spaced apart locations on said aerodynamic member;
   locating said actuator in flow communication with both of said orifices;
   monitoring an actual attitude of the airborne vehicle;
   comparing the actual attitude to a desired attitude for said airborne vehicle; and
   controlling the actuator to cause an oscillating fluid flow through said first and second orifices that modifies said boundary layer in a manner that enables said actual attitude to be brought into conformance with said desired attitude.

15. The method of claim 14, wherein said actuator is controlled such that one of said orifices experiences a jet of air while the other said orifice simultaneously experiences a suction force.

16. The method of claim 14, wherein said oscillating fluid flow is generally perpendicular to said boundary layer.

17. The method of claim 14, wherein forming said first and second orifices comprises forming said first and second orifices in opposing surfaces of said aerodynamic member.

18. The method of claim 14, wherein locating said actuator in flow communication with said first and second orifices comprises locating said actuator in a longitudinal flow path extending into communication with both of said first and second orifices.

19. The method of claim 14, wherein the method of controlling the attitude of a airborne vehicle comprises controlling the attitude of an aerial refueling aircraft.

* * * * *